(12) United States Patent
Lin et al.

(10) Patent No.: US 12,555,824 B2
(45) Date of Patent: Feb. 17, 2026

(54) ADDITIVE FOR BATTERY ELECTROLYTE, LITHIUM ION BATTERY ELECTROLYTE, AND LITHIUM ION BATTERY

(71) Applicant: SHENZHEN BAK POWER BATTERY CO., LTD., Guangdong (CN)

(72) Inventors: Jian Lin, Guangdong (CN); Xiaoyun Zhan, Guangdong (CN); Weifeng An, Guangdong (CN)

(73) Assignee: SHENZHEN BAK POWER BATTERY CO., LTD., Guangdong (CN)

( * ) Notice: Subject to any disclaimer, the term of this patent is extended or adjusted under 35 U.S.C. 154(b) by 613 days.

(21) Appl. No.: 17/769,166

(22) PCT Filed: May 19, 2020

(86) PCT No.: PCT/CN2020/091053
§ 371 (c)(1),
(2) Date: Apr. 14, 2022

(87) PCT Pub. No.: WO2021/093296
PCT Pub. Date: May 20, 2021

(65) Prior Publication Data
US 2024/0136576 A1   Apr. 25, 2024

(30) Foreign Application Priority Data
Nov. 12, 2019   (CN) .......................... 201911101375.6

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/386* (2013.01); *H01M 4/505* (2013.01);
(Continued)

(58) Field of Classification Search
CPC ......... H01M 10/0567; H01M 10/0525; H01M 10/0568; H01M 10/0569; H01M 4/386;
(Continued)

(56) References Cited

U.S. PATENT DOCUMENTS 9,227,950 B2 * 1/2016 Mio .................. H01M 10/0525
2005/0106470 A1  5/2005 Yoon et al.
(Continued)

FOREIGN PATENT DOCUMENTS

CN    102244296       11/2011
CN    106905291 A  *  6/2017  ........... C07D 327/10
(Continued)

OTHER PUBLICATIONS

Wang et al.; Effect of the Electrolyte Additive of Ethylene Sulfate Replacing Propylene Sulfate on te Performance of Lithium-ion Battery, Chinese Battery Industry, vol. 21 No.2, Apr. 2017.
(Continued)

*Primary Examiner* — Karie O'Neill Apicella
(74) *Attorney, Agent, or Firm* — Brooks Kushman P.C.

(57) ABSTRACT

An additive for a battery electrolyte, including at least one of compounds represented by structural formulae in the present application text. The additive for a battery electrolyte provided in the present application can form low-impedance protective films on electrode surfaces, suppress side reactions between the electrodes and the electrolyte, reduce interface impedances, consider both high and low temperature performances, and improve an overall output performance of the lithium ion battery.

12 Claims, 3 Drawing Sheets

(51) Int. Cl.
- *H01M 4/38* (2006.01)
- *H01M 4/505* (2010.01)
- *H01M 4/525* (2010.01)
- *H01M 4/58* (2010.01)
- *H01M 4/583* (2010.01)
- *H01M 10/0525* (2010.01)
- *H01M 10/0568* (2010.01)
- *H01M 10/0569* (2010.01)

(52) U.S. Cl.
CPC ......... *H01M 4/525* (2013.01); *H01M 4/5825* (2013.01); *H01M 4/583* (2013.01); *H01M 10/0525* (2013.01); *H01M 10/0568* (2013.01); *H01M 10/0569* (2013.01); *H01M 2004/027* (2013.01); *H01M 2004/028* (2013.01); *H01M 2300/004* (2013.01)

(58) Field of Classification Search
CPC .... H01M 4/505; H01M 4/525; H01M 4/5825; H01M 4/583
See application file for complete search history.

(56) References Cited

U.S. PATENT DOCUMENTS

| | | |
|---|---|---|
| 2006/0199080 A1 | 9/2006 | Amine et al. |
| 2008/0160415 A1 | 7/2008 | Wakita et al. |
| 2008/0311481 A1 | 12/2008 | Kim et al. |
| 2013/0171514 A1 | 7/2013 | Mio et al. |
| 2016/0072150 A1 | 3/2016 | Kim et al. |
| 2017/0346127 A1 | 11/2017 | Zhang et al. |
| 2018/0006329 A1 | 1/2018 | Xiao et al. |
| 2018/0166746 A1* | 6/2018 | Shimamoto .......... C07D 327/00 |
| 2018/0241084 A1 | 8/2018 | Miyasato et al. |

FOREIGN PATENT DOCUMENTS

| | | |
|---|---|---|
| CN | 107293785 A | 10/2017 |
| CN | 108134134 A | 6/2018 |
| CN | 110299562 A | 10/2019 |
| CN | 110380119 A | 10/2019 |
| CN | 110931863 A | 3/2020 |
| JP | 2004125834 A | 4/2004 |
| JP | 2018181772 A | 11/2018 |
| JP | 2019179609 A | 10/2019 |
| KR | 20130043221 A | 4/2013 |
| KR | 20160029457 A | 3/2016 |
| WO | 2015159824 A1 | 10/2015 |
| WO | WO2015093532 A1 | 3/2017 |

OTHER PUBLICATIONS

International Search Report for PCT/CN2020/091053, Prepared by the CN National IP Administration, Mailed Aug. 11, 2020, 5 pages including English Translation.

Self F. et al.: The role of prop-1-ene-1, 3-sultone as an additive in lithium-ion cells, Journal of Power Sources, 2015.

Office Action for Korean KR Application No. 10-2022-7012518, dated Aug. 7, 2024, 16 Pages.

* cited by examiner

ADDITIVE FOR BATTERY ELECTROLYTE, LITHIUM ION BATTERY ELECTROLYTE, AND LITHIUM ION BATTERY

CROSS-REFERENCE TO RELATED APPLICATION

This application is the U.S. national phase of PCT Application No. PCT/CN2020/091053 filed on May 19, 2020, which claims priority to CN patent application No. 201911101375.6 filed on Nov. 12, 2019, the disclosures of which are incorporated in their entirety by reference herein.

TECHNICAL FIELD

The present application relates to the technical field of lithium ion batteries, and more particularly to an additive for a battery electrolyte, a lithium ion battery electrolyte, and a lithium ion battery.

BACKGROUND

Lithium ion secondary battery, known as a green energy, is the most competitive battery of the new generation and is the preferred technology to solve contemporary environmental pollution and energy problems. In recent years, lithium ion secondary batteries have achieved great success in the field of high-energy batteries, but consumers still expect batteries with higher comprehensive performance, which depends on the research and development of new electrode materials and electrolyte systems. At present, electronic digital products such as smart phones and tablet computers impose higher and higher requirements on the energy density of batteries, making it difficult for commercial lithium ion secondary batteries to meet the requirements. The energy density of the battery can be improved by two ways, one way is to select positive and negative materials with high capacity and high compaction, and the other way is to increase the working voltage of the battery.

A pure silicon negative electrode has a theoretical gram capacity as high as 4200 mAh/g, thus being an ideal high-capacity negative electrode material for the lithium ion secondary battery. However, when the pure silicon is used as the negative electrode of the lithium ion secondary battery, due to the volume effect, the battery is prone to swell, the electrode plates are pulverized seriously, and the cycle performance is poor. In addition, silicon-based materials has poor conductivity, resulting in poor low temperature performance of the battery. It has been considered to combine the silicon material and carbon material to form a silicon carbon composite material, which can greatly improve the specific capacity and conductivity of the material, and reduce the volume effect of the silicon-based materials to a certain degree. When the silicon carbon composite material is combined with the high-capacity high-nickel positive electrode, a resulting energy density can reach 300 Wh/Kg higher. Matching electrolytes have also emerged accordingly, and have become a hot spot in the research of lithium ion secondary battery electrolyte.

Fluoroethylene carbonate can form a uniform and stable solid electrolyte interface (SEI) film on the surface of the silicon carbon negative electrode. Due to the particularity of the silicon carbon negative electrode material (battery swelling and severe pulverization of the pole piece), the electrolyte system thereof often needs more film-forming additives than the graphite negative electrode system does, and thus often needs a great amount of fluoroethylene carbonate. However, fluoroethylene carbonate is easily decomposed in a high temperature environment or in a high-nickel positive electrode battery system, and cannot meet the requirements of high temperature use of the battery; and the use of fluoroethylene carbonate alone has many disadvantages. In order to solve the flatulence problem of lithium ion secondary batteries containing fluoroethylene carbonate during the high-temperature storage, technical solutions as disclosed in CN201110157665 adds organic dinitrile substances (NC—$(CH_2)_n$—CN, where n=2-4) to suppress the flatulence. US 2008/0311481A1 discloses ether/aryl compounds containing two nitrile groups, which can overcome the flatulence problem of batteries under high voltage and high temperature conditions, and improve high temperature storage performance. However, the application of nitrile compounds to the ternary high nickel positive electrode material system will increase the polarization of the battery and seriously deteriorate the cycle performance and the low temperature performance.

Technical Problem

It is an objective of the present application to provide an additive for a battery electrolyte, which aims at solving the technical problem that in the existing lithium ion battery, electrolyte is prone to be oxidized and decomposed at high temperature condition, thus being unable to consider both the high temperature storage performance and low temperature discharge performance of the battery.

Technical Solutions

It is another object of the present application to provide a lithium ion battery electrolyte containing the above additive, as well as a lithium ion battery.

In order to achieve the above objectives, the following technical solutions are adopted by the present application.

In a first aspect of the present application, an additive for a battery electrolyte is provided. The additive comprises at least one of compounds represented by structural formulas (1)-(7):

Formula (1)

Formula (2)

-continued

Formula (3)

Formula (4)

Formula (5)

Formula (6)

Formula (7)

Formula (1)

Formula (2)

Formula (3)

Formula (4)

Formula (5)

Formula (6)

In a second aspect of the present application, a lithium ion battery electrolyte is provided. The lithium ion battery electrolyte comprises: a non-aqueous organic solvent, a lithium salt, and an additive. The additive comprises at least one of compounds represented by structural formulas (1)-(7):

Formula (7)

Optionally, the at least one of compounds represented by structural formulas (1)-(7) is used as a first type of additive. A weight percent of the first type of additive is between 0.05 wt. % and 2 wt. %, based on a total weight of the electrolyte being 100 wt. %.

Optionally, the additive further comprises a second type of additive. The second type of additive is at least one selected from fluoroethylene carbonate, vinylene carbonate, 1,3-propane sultone, 1,4-butane sultone, 1,3-propene sultone, vinyl sulfate, and propylene sulfate.

Optionally, a sum of a weight percent of the additive is smaller than or equal to 15 wt. %, based on the total weight of the electrolyte being 100 wt. %.

Optionally, the non-aqueous organic solvent comprises at least one of ethylene carbonate, propylene carbonate, butylene carbonate, dimethyl carbonate, diethyl carbonate, ethyl methyl carbonate, methyl n-propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

Optionally, a sum of the weight percent of the non-aqueous organic solvent is between 55% and 75%, based on the total weight of the electrolyte being 100 wt. %.

In a third aspect of the present application, a lithium ion battery is provided. The lithium ion battery comprises: a positive electrode, a negative electrode, a separator, and an electrolyte. The electrolyte is the above-described lithium ion battery electrolyte.

Optionally, an active material for the positive electrode is a transition metal oxide; and an active material for the negative electrode is graphite, a Si-containing composite material, or lithium titanate.

Optionally, the transition metal oxide is $LiNi_xCo_yMn_zL_{(1-x-y-x)}O_2$, in which, L is one of Al, Sr, Mg, Ti, Ca, Zr, Zn, Si, and Fe; and values of x, y, and z satisfy: $0 \le x<1$, $0<y \le 1$, $0 \le z<1$, and $0<x+y+z \le 1$.

The additive for a battery electrolyte provided by the present application comprises at least one of the compounds represented by the structural formulas (1)-(7). All structures of the compounds represented by the structural formulas (1)-(7) contain a structure of vinyl sulfate (DTD), on the basis of which, at least one carbon atom of a ring of the vinyl sulfate is connected with one of vinyl sulfate group, 2,2-dimethyl-1,3-dioxanyl group, an ester group, a siloxane group, and a fluorine-substituted phenyl ether group, thus forming the additive of the electrolyte. The additive of the electrolyte is configured for forming a protective film on an electrode surface during the first charging process, so as to improve the output performance of the battery. The structures and functions of the additives are described specifically as follows:

At least one DTD structure is connected to the at least one carbon atom of the DTD structure, such as in the compound represented by the structural formula (1), the compound represented by the structural formula (4), and the compound represented by the structural formula (6). Compared with a single DTD structure, copolymers of two DTD structures have improved stability of molecular structure and reduced reactivity, and are capable of forming a thinner, denser, and more stable SEI when being pre-charged with a small current, thus having comprehensively improved output performance of the battery.

—$CO_2CH_3$ groups are connected to carbon atoms of the DTD structure, such as in the compound represented by structural formula (3). Each —$CO_2CH_3$ group is connected to the C—O in the ring of the DTD structure to form an ethoxy segment. Ethoxy segments increase in components of the SEI film formed by precharging with a small current, the lithium conductivity is enhanced, thereby reducing the battery impedance and improving the power characteristics of the battery.

—$CHCH_2O_2(CH_3)_2$ group is connected to a carbon atom of the DTD structure, such as in the compound represented by the structural formula (2), the compound represented by the structural formula (5), the compound represented by the structural formula (6), and the compound represented by the structural formula (7). The group $[CHCH_2O_2(CH_3)_2]$ itself contains ethoxy segments, and the increase of ethoxy segments in the molecular structure can increase the ethoxy segments in components of the formed SEI film, which enhances the lithium conductivity, thereby reducing the battery impedance and improving the power characteristics of the battery.

In particular, when the group connected to the carbon atom of the DTD structure further contains an alkyl silicon group, such as in the compound represented by the structural formula (5), the silicon-containing group can effectively remove HF and $H_2O$, which contain active proton hydrogen, from the electrolyte, as well as participate in the film formation on the electrode surface, thereby realizing multifunctional effect of a single additive, and comprehensively improving the output performance of the battery.

In addition, in the compounds represented by the structural formulas (1)-(7), at least one carbon atom of the ring of the vinyl sulfate is connected with one of vinyl sulfate group, 2,2-dimethyl-1,3-dioxanyl group, the ester group, the siloxane group, and the fluorine-substituted phenyl ether group, which can alleviate a small ring strain of the vinyl sulfate (DTD) structure and reduce the molecular activity. Compared with the single DTD structure, the compounds represented by the structural formulas (1)-(7) have reduced activities, and therefore is not prone to discoloration when being added to electrolyte.

The lithium ion battery electrolyte provided by the present application contains the additive for a battery electrolyte as described in the present application, which can form low-impedance protective films on electrode surfaces of both the negative and positive electrodes, suppress the side reactions between the electrodes and the electrolyte, reduce the interface impedances, take into account both high and low temperature performances (that is, possessing excellent low temperature discharge performance, excellent cycle performance, and excellent high temperature storage performance), and improve an overall output performance of the lithium ion battery.

Advantageous Effects

The lithium ion battery provided by the present application, due to containing the lithium ion battery electrolyte of the present application, is capable of significantly improving the cycle performance and the low temperature discharge performance of the lithium ion battery, and improving the overall output performance of the lithium ion battery.

BRIEF DESCRIPTION OF THE DRAWINGS

In order to illustrate the technical solutions more clearly in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

DETAILED DESCRIPTION OF THE EMBODIMENTS

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

Moreover, the terms "first" and "second" are adopted for descriptive purposes only and are not to be construed as indicating or implying a relative importance or implicitly indicating the number of technical features indicated. Thus, features prefixed by "first" and "second" will explicitly or implicitly represent that one or more of the referred technical features are included. In the description of the present application, the meaning of "a plurality of" or "multiple" is two or more unless otherwise specifically defined.

The weight of the relevant components mentioned in embodiments in the description of the present application can not only refer to the specific content of each component, but also can represent a proportional relationship between the weights of the components. Therefore, as long as the contents of the relevant components are proportionally enlarged or reduced according to the embodiments in the description of the present application, they are all within the scope disclosed in the embodiments in the description of the present application. Specifically, the weight described in the embodiments in the description of the present application may be a mass unit known in the chemical field, such as μg, mg, g, and kg.

A first aspect of embodiments of the present application provides an additive for a battery electrolyte. The additive comprises at least one of compounds represented by structural formulas (1)-(7):

Formula (1)

Formula (2)

Formula (3)

Formula (4)

Formula (5)

and

Formula (6)

Formula (7)

The additive for a battery electrolyte provided by the present application comprises at least one of the compounds represented by the structural formulas (1)-(7). All structures of the compounds represented by the structural formulas (1)-(7) contain a structure of vinyl sulfate (DTD), on the basis of which, at least one carbon atom of a ring of the vinyl sulfate is connected with one of vinyl sulfate group, 2,2-dimethyl-1,3-dioxanyl group, an ester group, a siloxane group, and a fluorine-substituted phenyl ether group, thus forming the additive of the electrolyte. The additive of the electrolyte is configured for forming a protective film on an electrode surface during the first charging process, so as to improve the output performance of the battery. The structures and functions of the additives are described specifically as follows:

At least one DTD structure is connected to the at least one carbon atom of the DTD structure, such as in the compound represented by the structural formula (1), the compound represented by the structural formula (4), and the compound represented by the structural formula (6). Compared with a single DTD structure, copolymers of two DTD structures have improved stability of molecular structure and reduced reactivity, and are capable of forming a thinner, denser, and more stable SEI when being pre-charged with a small current, thus having comprehensively improved output performance of the battery.

—$CO_2CH_3$ groups are connected to carbon atoms of the DTD structure, such as in the compound represented by structural formula (3). Each —$CO_2CH_3$ group is connected to the C—O in the ring of the DTD structure to form an ethoxy segment. Ethoxy segments increase in components of the SEI film formed by precharging with a small current, the lithium conductivity is enhanced, thereby reducing the battery impedance and improving the power characteristics of the battery.

—$CHCH_2O_2(CH_3)_2$ group is connected to a carbon atom of the DTD structure, such as in the compound represented by the structural formula (2), the compound represented by the structural formula (5), the compound represented by the structural formula (6), and the compound represented by the structural formula (7). The group [$CHCH_2O_2(CH_3)_2$] itself contains ethoxy segments, and the increase of ethoxy segments in the molecular structure can increase the ethoxy segments in components of the formed SEI film, which enhances the lithium conductivity, thereby reducing the battery impedance and improving the power characteristics of the battery.

In particular, when the group connected to the carbon atom of the DTD structure further contains an alkyl silicon group, such as in the compound represented by the structural formula (5), the silicon-containing group can effectively remove HF and $H_2O$, which contain active proton hydrogen, from the electrolyte, as well as participate in the film formation on the electrode surface, thereby realizing multi-functional effect of a single additive, and comprehensively improving the output performance of the battery.

In addition, in the compounds represented by the structural formulas (1)-(7), at least one carbon atom of the ring of the vinyl sulfate is connected with one of vinyl sulfate group, 2,2-dimethyl-1,3-dioxanyl group, the ester group, the siloxane group, and the fluorine-substituted phenyl ether group, which can alleviate a small ring strain of the vinyl sulfate (DTD) structure and reduce the molecular activity. Compared with the single DTD structure, the compounds represented by the structural formulas (1)-(7) have reduced activities, and therefore is not prone to discoloration when being added to electrolyte.

A second aspect of embodiments of the present application provides a lithium ion battery electrolyte. The electrolyte comprises: a non-aqueous organic solvent, a lithium salt, and an additive. The additive comprises at least one of compounds represented by structural formulas (1)-(7):

Formula (1)

Formula (2)

Formula (3)

Formula (4)

Formula (5)

Formula (6)

and

Formula (7)

The lithium ion battery electrolyte provided by the present application contains the additive for a battery electrolyte as described in the present application, which can form low-impedance protective films on electrode surfaces of both the negative and positive electrodes, suppress the side reactions between the electrodes and the electrolyte, reduce the interface impedances, take into account both high and low temperature performances (that is, possessing excellent low temperature discharge performance, excellent cycle performance, and excellent high temperature storage performance), and improve an overall output performance of the lithium ion battery.

Various components of the lithium ion battery electrolyte are described in details hereinbelow.

Non-Aqueous Organic Solvent

Because water has a certain influence on the formation of the SEI and battery performance of the lithium ion battery, and such influence is specifically reflected in aspects including: smaller battery capacity, shorter discharge time, increased internal resistance, cycle capacity decay, and battery expansion. In embodiments of the present application, the non-aqueous organic solvent is used as a solvent component of the electrolyte.

Optionally, the non-aqueous organic solvent comprises at least one of ethylene carbonate, propylene carbonate, butylene carbonate, dimethyl carbonate, diethyl carbonate, ethyl methyl carbonate, methyl n-propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

Optionally, a sum of the weight percent of the non-aqueous organic solvent is between 55% and 75%, based on the total weight of the electrolyte being 100 wt. %.

Lithium Salt

In embodiments of the present application, the lithium salt can be selected from a lithium salt that is commonly used in the lithium ion battery, including but not limited to, one or more of lithium hexafluorophosphate, lithium perchlorate, lithium tetrafluoroborate, lithium bisoxalate borate, lithium difluorooxalate borate, lithium bis(trifluoromethylsulfonyl) imide, and lithium bisfluorosulfonimide. Furthermore, an amount of the lithium salt accounts for between 10 wt. % and 18 wt. % of a lithium ion secondary battery electrolyte.

Additive

In embodiments of the present application, the additive is mainly used to improve the film-forming performance during the first charge and discharge.

The additive provided by embodiments of the present application comprises at least one of the compounds represented by the structural formulas (1)-(7). All structures of the compounds represented by the structural formulas (1)-(7) contain a structure of vinyl sulfate (DTD), on the basis of which, at least one carbon atom of a ring of the vinyl sulfate is connected with one of vinyl sulfate group, 2,2-dimethyl-1,3-dioxanyl group, an ester group, a siloxane group, and a fluorine-substituted phenyl ether group, thus forming the additive of the electrolyte. The additive of the electrolyte is configured for forming a protective film on an electrode surface during the first charging process, so as to improve the output performance of the battery. The structures and functions of the additives are described specifically as follows:

At least one DTD structure is connected to the at least one carbon atom of the DTD structure, such as in the compound represented by the structural formula (1), the compound represented by the structural formula (4), and the compound represented by the structural formula (6). Compared with a single DTD structure, copolymers of two DTD structures have improved stability of molecular structure and reduced reactivity, and are capable of forming a thinner, denser, and more stable SEI when being pre-charged with a small current, thus having comprehensively improved output performance of the battery.

—$CO_2CH_3$ groups are connected to carbon atoms of the DTD structure, such as in the compound represented by structural formula (3). Each —$CO_2CH_3$ group is connected to the C—O in the ring of the DTD structure to form an ethoxy segment. Ethoxy segments increase in components of the SEI film formed by precharging with a small current, the lithium conductivity is enhanced, thereby reducing the battery impedance and improving the power characteristics of the battery.

—$CHCH_2O_2(CH_3)_2$ group is connected to a carbon atom of the DTD structure, such as in the compound represented by the structural formula (2), the compound represented by the structural formula (5), the compound represented by the structural formula (6), and the compound represented by the structural formula (7). The group [$CHCH_2O_2(CH_3)_2$] itself contains ethoxy segments, and the increase of ethoxy segments in the molecular structure can increase the ethoxy segments in components of the formed SEI film, which enhances the lithium conductivity, thereby reducing the battery impedance and improving the power characteristics of the battery.

In particular, when the group connected to the carbon atom of the DTD structure further contains an alkyl silicon group, such as in the compound represented by the structural formula (5), the silicon-containing group can effectively remove HF and H$_2$O, which contain active proton hydrogen, from the electrolyte, as well as participate in the film formation on the electrode surface, thereby realizing multi-functional effect of a single additive, and comprehensively improving the output performance of the battery.

In addition, in the compounds represented by the structural formulas (1)-(7), at least one carbon atom of the ring of the vinyl sulfate is connected with one of vinyl sulfate group, 2,2-dimethyl-1,3-dioxanyl group, the ester group, the siloxane group, and the fluorine-substituted phenyl ether group, which can alleviate a small ring strain of the vinyl sulfate (DTD) structure and reduce the molecular activity. Compared with the single DTD structure, the compounds represented by the structural formulas (1)-(7) have reduced activities, and therefore is not prone to discoloration when being added to electrolyte.

Optionally, the at least one of compounds represented by structural formulas (1)-(7) is used as a first type of additive. A weight percent of the first type of additive is between 0.05 wt. % and 2 wt. %, based on a total weight of the electrolyte being 100 wt. %. If the weight percent of the first type of additive is lower than 0.05%, neither can a stable protective film be formed on the electrode surface, nor can the improvement effects of suppressing the side reactions between the electrodes and the electrolyte, lowering the interface impedance, or comprehensively improving the output performance of the battery be achieved. In addition, the output performance of the battery containing a high nickel and silicon carbon system cannot be improved. Meanwhile, if the weight percent of the first type of additive is higher than 2%, the protective film formed on the electrode surfaces are too thick, the battery polarization increases, and the battery performance is deteriorated.

In an embodiment of the present application, on the basis that the at least one of compounds represented by structural formulas (1)-(7) is used as a first type of additive, the performance of the lithium ion battery can be optimized by addition of other additives. Optionally, the additive further comprises a second type of additive, and the second type of additive is at least one selected from fluoroethylene carbonate, vinylene carbonate, 1,3-propane sultone, 1,4-butane sultone, 1,3-propene sultone, vinyl sulfate, and propylene sulfate.

Optionally, a sum of a weight percent of the additive is smaller than or equal to 15 wt. %, based on the total weight of the electrolyte being 100 wt. %. On this basis, a weight percent of any one of optional additives (fluoroethylene carbonate, vinylene carbonate, 1,3-propane sultone, 1,4-butane sultone, 1,3-propene sultone, vinyl sulfate, and propylene sulfate) respectively accounts for between 0.1 wt. % and 10 wt. % of a total weight of the electrolyte.

Moreover, a third aspect of embodiments of the present application provides a lithium ion battery. The lithium ion battery comprises: a positive electrode, a negative electrode, a separator, and an electrolyte, in which, the electrolyte is the lithium ion battery electrolyte.

The lithium ion battery provided by the present application, due to containing the lithium ion battery electrolyte of the present application, is capable of significantly improving the cycle performance and the low temperature discharge performance of the lithium ion battery, and improving the overall output performance of the lithium ion battery.

In embodiments of the present application, the components of the electrolyte, the selection, content, preferred type and selection basis of each component are as described as above, which will not be repeated herein for the simplicity.

The positive electrode includes an active material for the positive electrode. All active materials for the positive electrode that are commonly used in the lithium ion battery can be applied to embodiments of the present application. But optionally, the active material of the positive electrode is a transition metal oxide.

In particular, optionally, the transition metal oxide is LiNi$_x$Co$_y$Mn$_z$L$_{(1-x-y-z)}$O$_2$, in which, L is one of Al, Sr, Mg, Ti, Ca, Zr, Zn, Si, and Fe; and values of x, y, and z satisfy: 0≤x<1, 0<y≤1, 0≤z<1, and 0<x+y+z≤1.

The negative electrode includes an active material for the negative electrode. All active materials for the negative electrode that are commonly used in the lithium ion battery can be applied to embodiments of the present application. But optionally, the active material for the negative electrode is graphite, a Si-containing composite material, or lithium titanate.

The choice of the separator includes, but is not limited to, a single-layer polyethylene (PE), a single-layer polypropylene (PP), a double-layer PP/PE, a triple-layer PP/PE/PP, or a ceramic separator.

The following description will be given in combination with specific embodiments.

In each embodiment, English abbreviation and corresponding interpretations are explained as follows:

EC: ethylene carbonate;

EMC: ethyl methyl carbonate;

DMC: dimethyl carbonate;

LiPF6: lithium hexafluorophosphate; and

P1: allyl phosphate.

In each embodiment, the additive structures used and their corresponding letter numbers are shown in Table 1 below.

TABLE 1

| Additive | Number | Structural formula |
|---|---|---|
| Compound | D1 |  |
| | D2 |  |

TABLE 1-continued

| Additive | Number | Structural formula |
|---|---|---|
| D3 | |  |
| D4 | |  |
| D5 | |  |
| D6 | |  |
| D7 | |  |

EXAMPLE 1

A lithium ion secondary battery includes: a positive electrode, a negative electrode, a separator, and an electrolyte. The active material for the positive electrode is nickel cobalt lithium manganate (NCM811) material. The active material for the negative electrode is a silicon carbon composite material (Si/C). The preparation method of lithium ion secondary battery were performed by the following steps:

The active material NCM811 for the positive electrode, conductive carbon black, and binder polyvinylidene fluoride were mixed according to a weight ratio of 96.8:2.0:1.2, and dispersed in N-methyl-2-pyrrolidone to obtain a positive electrode slurry. Thereafter, the positive electrode slurry was uniformly coated onto two sides of an aluminum foil, which was then dried, calendered, and vacuum dried; and an aluminum lead wire was welded by an ultrasonic welder, to obtain a positive electrode plate (positive electrode piece). The obtained positive electrode plate had a thickness of between 135 μm and 160 μm.

A silicon carbon composite material, a conductive carbon black, a binder styrene-butadiene rubber, and a carboxymethyl cellulose were mixed according to a weight ratio of 96:1:1.2:1.8, and dispersed in a deionized water to obtain a negative electrode slurry. Thereafter, the negative electrode slurry was coated onto two sides of a copper foil, which was then dried, calendered, and vacuum dried; and a nickel lead wire was welded by an ultrasonic welder, to obtain a negative electrode plate (negative electrode piece). The obtained negative electrode plate had a thickness of between 135 μm and 160 μm.

Ethylene carbonate (EC), ethyl methyl carbonate (EMC), and dimethyl carbonate (DMC) were mixed according to a weight ratio of 2:1:7, after the mixing, a lithium hexafluorophosphate having a weight percent of 12.5 wt. % based on a total weight of the electrolyte was added to D1 having a weight percent of 1 wt. % based on the total weight of the electrolyte. Thus, the electrolyte was prepared.

A PP-based film having a thickness of 14 μm is used, and a single side of the PP-based film was coated with a ceramic separator of $Al_2O_3$ having a thickness of 2 μm.

The obtained positive electrode plate, the separator, and the negative electrode plate were placed on an automatic winding machine, and a bare cell was obtained by winding. The bare cell was placed in a cylindrical steel shell, a negative electrode tab and a cap tab are welded, and electrolyte prepared in the above was injected into a dried cell, sealed, stood, pre-charged, aged, and volume-distributed to complete the preparation of lithium ion secondary battery (21700-4.8 Ah).

Examples 2-10

Preparations of the positive electrode, the negative electrode, the separator, and lithium ion secondary battery in Examples 2-10 are the same as those in Example 1, except for the difference in components of the electrolyte. The selection of the first kind of additive (at least one of compounds represented by formulas (1)-(7)) and the content thereof are listed in Table 2.

COMPARATIVE EXAMPLES

Preparations of the positive electrode, the negative electrode, the separator, and lithium ion secondary battery in Comparative Examples 1-2 are the same as those in Example 1, except for the differences in types and amounts (based on the total weight of the electrolyte) of the additive in the electrolyte. The non-aqueous organic solvent and the selection of the additive and the content thereof are listed in Table 2.

The lithium ion secondary batteries prepared in Examples 1-10, Comparative Example 1, and Comparative Example 2 were evaluated by the following test methods:

1) Capacity Differential Curve

After the battery was filled with the electrolyte and sealed, and stood for 48 hrs, the battery was precharged in the abin test cabinet to 4.2 V with a 0.1 C constant current, and then discharged to 2.75 V. A capacity-voltage curve was derived, screened, and differentiated to obtain a d Q/d V~V curve.

2) Cycle Performance Test

A divided battery was charged at a temperature of 25±2° C./45° C.±2° C. with a 0.5 C constant current and constant voltage to 4.2 V (a cut-off current was 0.01 C), and then discharged with 1 C constant current to 2.75 V. The retention rate of the N-th cycle capacity was calculated after N cycles of charge/discharge, and the calculation formula was as follows:

Nth cycle capacity retention rate (%)=(Nth cycle discharge capacity/1st cycle discharge capacity)×100%;

3) High Temperature Storage Performance

The divided battery was charged at room temperature with a 0.5 C constant current and constant voltage to 4.2 V (the cut-off current was 0.01 C), an initial discharge capacity of the battery was measured. Thereafter, the divided battery was stored at a temperature of 60° C. for 7 days, then, discharged with a 0.5 C constant current and constant voltage to 2.75 V to measure a retention capacity and a recovery capacity of the battery by adopting the following calculation equations:

Battery capacity retention rate (%)=retention capacity/initial capacity×100%; and Battery capacity recovery rate (%)=recovery capacity/initial capacity×100%.

4) Discharge at Low Temperature

The battery was firstly discharged at room temperature with a 0.5 C constant current and constant voltage to 4.2V, stood for 5 mins, then discharged with a 0.2 C to 2.75 V, to measure an initial capacity of the battery. The battery was then stood for another 5 min, charged at the 0.5 C constant current and constant voltage to 4.2V (the cut-off current was 0.01 C). After that, the battery was placed in a low temperature box of −20° C. for 6 hrs, and discharged with a 0.2 C to 2.75 V under this condition, to measure a discharge capacity at low temperature.

Low temperature discharge retention rate (%)=low temperature discharge capacity/initial capacity×100%.

The test results are shown in Table 2 below.

TABLE 2

| Example | Solvent and lithium salt | Formula I (wt. %) | Retention rate after 200 cycles at 45° C. (%) | Retention rate after 400 cycles at 25° C. (%) | 60° C. @7 d storage capacity retention rate (%) | 60° C. @7 d storage capacity recovery rate (%) | Discharge retention rate (%) at −20° C. |
|---|---|---|---|---|---|---|---|
| Example 1 | EC/EMC/DMC = 2/1/7 1M LiPF$_6$ | 1% D1 | 86.5% | 85.0% | 82.0% | 87.9% | 77.0% |
| Example 2 | EC/EMC/DMC = 2/1/7 1M LiPF$_6$ | 1% D2 | 84.9% | 82.1% | 80.5% | 86.5% | 77.8% |
| Example 3 | EC/EMC/DMC = 2/1/7 1M LiPF$_6$ | 1% D3 | 85.7% | 83.6% | 81.7% | 86.9% | 78.2% |
| Example 4 | EC/EMC/DMC = 2/1/7 1M LiPF$_6$ | 1% D4 | 87.1% | 85.2% | 81.9% | 87.3% | 78.1% |
| Example 5 | EC/EMC/DMC = 2/1/7 1M LiPF$_6$ | 1% D5 | 86.8% | 85.7% | 81.1% | 86.9% | 79.1% |
| Example 6 | EC/EMC/DMC = 2/1/7 1M LiPF$_6$ | 1% D6 | 84.7% | 82.8% | 81.3% | 86.1% | 76.3% |
| Example 7 | EC/EMC/DMC = 2/1/7 1M LiPF$_6$ | 1% D7 | 83.3% | 81.6% | 80.2% | 84.9% | 73.1% |
| Example 8 | EC/EMC/DMC = 2/1/7 1M LiPF$_6$ | 1% D1 5% FEC | 86.1% | 87.7% | 81.8% | 87.6% | 77.1% |
| Example 9 | EC/EMC/DMC = 2/1/7 1M LiPF$_6$ | 0.3% D1 1% D7 | 86.5% | 83.6% | 81.3% | 85.2% | 73.6% |
| Example 10 | EC/EMC/DMC = 2/1/7 1M LiPF$_6$ | 0.3% D1 1% D7 5% FEC | 88.9% | 85.7% | 80.9% | 85.1% | 73.8% |
| Comparative Example 1 | EC/EMC/DMC = 2/1/7 1M LiPF$_6$ | / | 58.6% | 60.1% | 51.6% | 60.8% | 70.6% |
| Comparative Example 2 | EC/EMC/DMC = 2/1/7 1M LiPF$_6$ | 1% P1 | 80.6% | 81.6% | 71.3% | 77.1% | 58.6% |

Battery systems containing a combination of NCM811 and the silicon carbon composite material in Examples 1-10, Comparative Example 1, and Comparative Example 2 were compared and analyzed. It can be seen from Table 2 that Examples 1-10 adopting the technical solution of the present application have excellent cycle performance, high temperature storage performance, and low temperature discharge performance; in contrast, the lithium ion batteries using the electrolyte of Comparative Example 1 and Comparative Example 2 have poor output performance, and cannot consider both the high and low temperature performance and cycle performances.

Specifically, comparing Examples with Comparative Example 1, the low temperature discharge performance, high temperature cycle performance, normal temperature cycle performance, and high temperature storage performance of Examples 1-10 containing compounds of the above structures are significantly better than those of Comparative Example 1, which demonstrates that the existence of D1, D2, D4, D4, D5, D6, D7, D1+D7 can effectively improve the comprehensive output performance of the battery.

Figure 1:
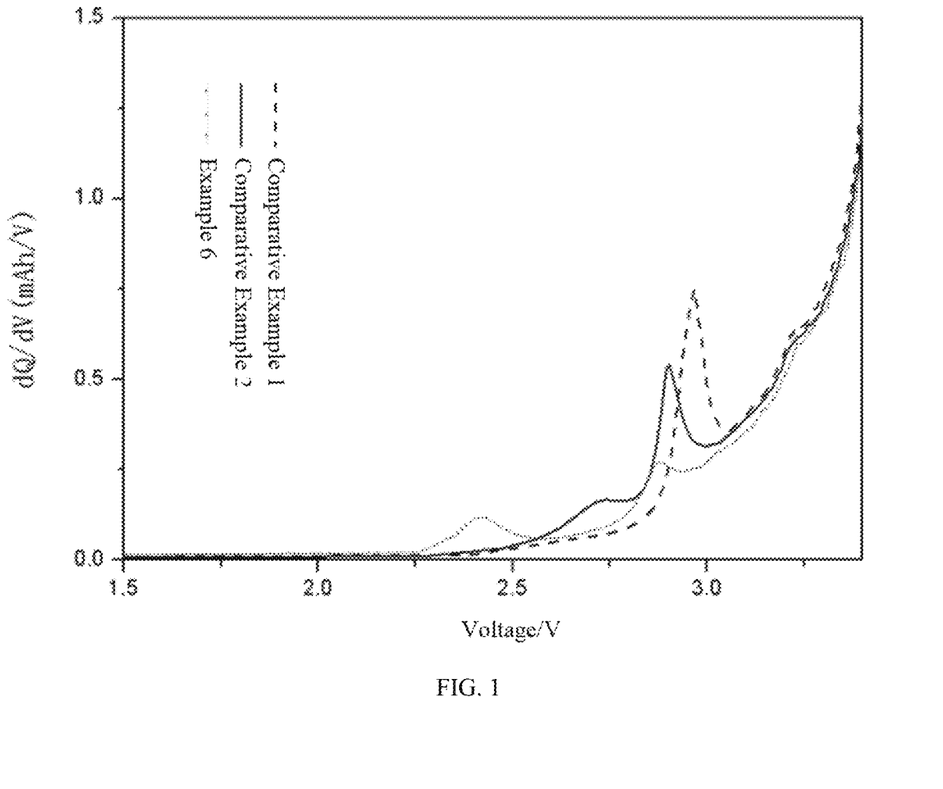
FIG. 1 shows capacity differential curves of Example 6 of the present application, Comparative Example 1, and Comparative Example 2.

The capacity differential curves of the first charge of the batteries of Comparative Example 1, Comparative Example 2, and Example 6 are drawn, as shown in FIG. 1. In Comparative Example 2, two reduction peaks at 2.7 V and 2.9 V appear, of which, the reduction peak at 2.7 V is a reduction peak at the negative electrode, while the reduction peak at 2.9 V is attributed to the reduction of solvent EC. P1 can be preferentially reduced prior to the solvent EC, and has a certain inhibition on the reduction of EC. The P1 structure contains 3 double bonds with high activity, and its X-axis integral area is large, so it is inferred that P1 structure has large film-forming resistance. In Example 6, two reduction peaks at 2.4 V and 2.9 V appear, and the reduction peak at 2.4 V was similar to that of the DTD, the reduction peak at 2.9 V is attributed to the reduction of solvent EC, and the intensity of EC reduction peak is significantly lower than those of Comparative Example 1 and Comparative Example 2, indicating that D6 is preferentially reduced prior to the solvent EC, which inhibits the reduction and decomposition of solvent EC. The SEI film component contains more ethoxy segments, the lithium conduction performance is improved, the impedance is low, and the corresponding X-axis integral area is small. In contrast, the reduction peak in Comparative Example 1 appears at about 3.0 V, which is attributed to the reduction of EC.

Figure 2:
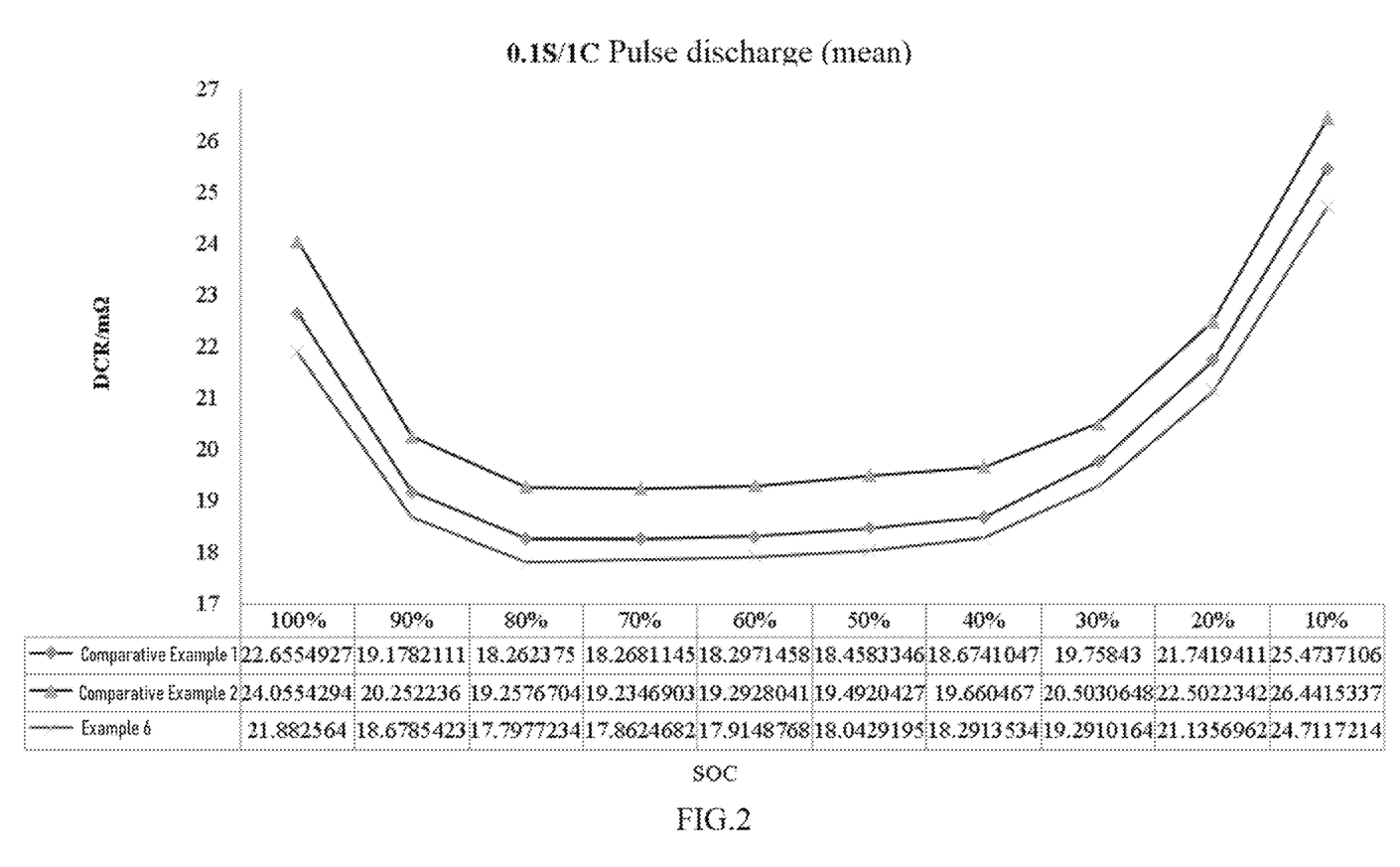
FIG. 2 is a diagram showing results of a direct current resistance (DCR) at different state of charge (SOC) of Example 6 of the present application, Comparative Example 1, and Comparative Example 2.

Resulting curves showing relationship between a direct current internal resistance (DCR) at corresponding state of charge (SOC) of Example 6 of the present application, Comparative Example 1, and Comparative Example 2 are drawn, as shown in FIG. 2 (the abscissa represents the state of charge SOC of the battery; the ordinate represents the DC resistance DCR), when the battery is at 10%~100% SOC, DCR of Example 6 (D6)<DCR of Comparative Example 1<DCR of Comparative Example 2 (P1). Due to the PEO-based segments contained in the D6 film-forming components, the lithium conductivity is enhanced, so the battery impedance is reduced.

Figure 3:
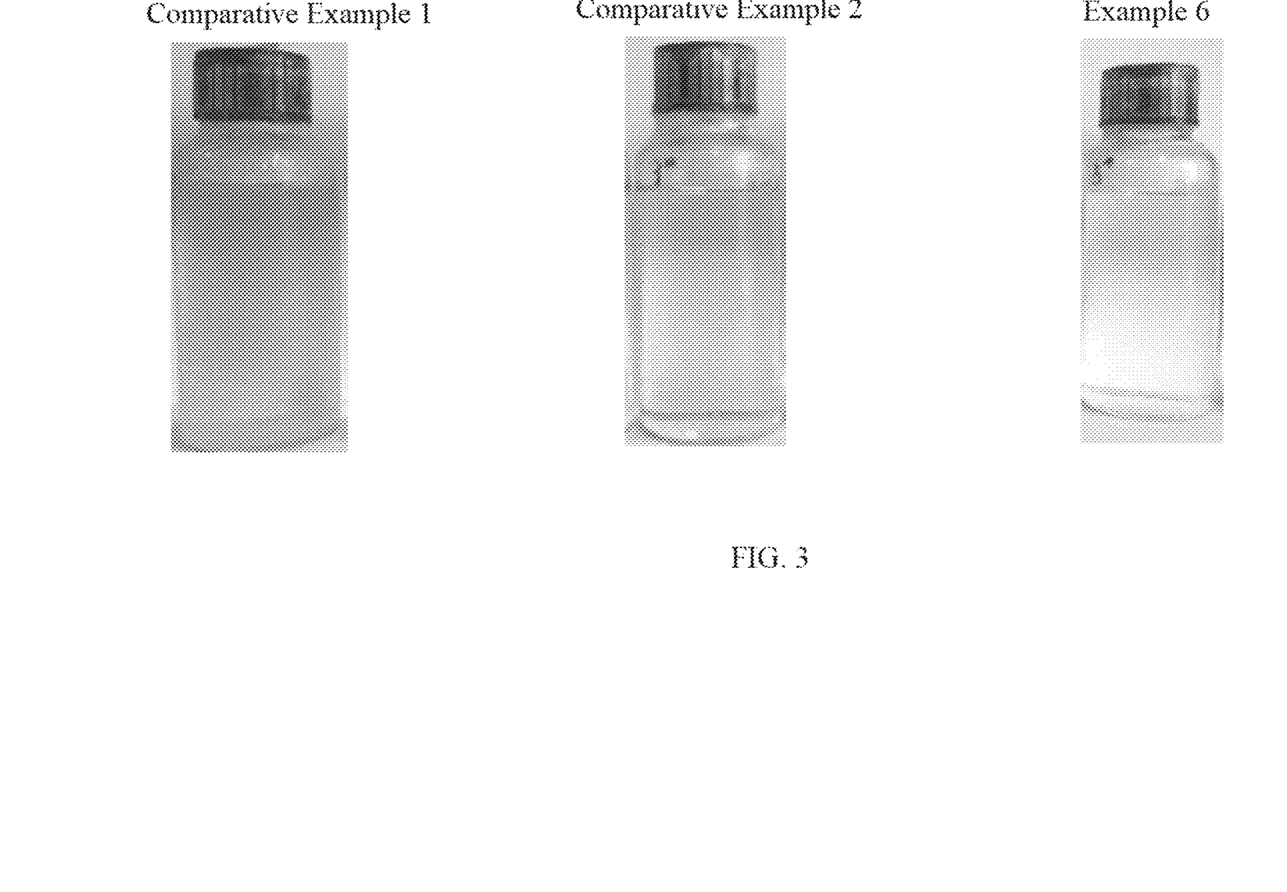
FIG. 3 is pictures showing results of storing electrolytes provided in Examples of the present application at room temperature (25° C.±3) for 30 days.

The results of storing the electrolytes provided in Example 6 of the present application, Comparative Example 1, and Comparative Example 2 at room temperature (25° C.±3) for 30 days are shown in FIG. 3. The electrolytes provided by Comparative Example 1 and Comparative Example 2 have obvious color changes, while the electrolyte provided by Example 6 does not have significant discoloration. It shows that the additive D6 has high stability, and it is not easy to be oxidized and discolored when standing at room temperature.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. A lithium ion battery electrolyte, comprising: a non-aqueous organic solvent, a lithium salt, and an additive; wherein the additive comprises a first type of additive, which is at least one of compounds represented by the following structural formulas:

Formula (2)

Formula (4)

Formula (5)

Formula (6)

-continued

Formula (7)

a weight percent of the first type of additive is between 0.05 wt. % and 2 wt. %, based on a total weight of the electrolyte being 100 wt. %;

the additive further comprises a second type of additive; and the second type of additive is at least one selected from fluoroethylene carbonate, vinylene carbonate, 1,3-propane sultone, 1,4-butane sultone, 1,3-propene sultone, vinyl sulfate, and propylene sulfate.

2. The lithium ion battery electrolyte according to claim 1, wherein a sum of a weight percent of the additive is smaller than or equal to 15 wt. %, based on the total weight of the electrolyte being 100 wt. %.

3. The lithium ion battery electrolyte according to claim 1, wherein the non-aqueous organic solvent comprises at least one of ethylene carbonate, propylene carbonate, butylene carbonate, dimethyl carbonate, diethyl carbonate, ethyl methyl carbonate, methyl n-propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

4. The lithium ion battery electrolyte according to claim 3, wherein a sum of the weight percent of the non-aqueous organic solvent is between 55% and 75%, based on the total weight of the electrolyte being 100 wt. %.

5. A lithium ion battery, comprising: a positive electrode, a negative electrode, a separator, and an electrolyte; the electrolyte being a lithium ion battery electrolyte comprising: a non-aqueous organic solvent, a lithium salt, and an additive; wherein the additive comprises a first type of additive, which is at least one of compounds represented by the following structural formulas:

Formula (2)

-continued

Formula (4)

Formula (5)

Formula (6)

and

Formula (7)

a weight percent of the first type of additive is between 0.05 wt. % and 2 wt. %, based on a total weight of the electrolyte being 100 wt. %;

the additive further comprises a second type of additive; and the second type of additive is at least one selected from fluoroethylene carbonate, vinylene carbonate, 1,3-propane sultone, 1,4-butane sultone, 1,3-propene sultone, vinyl sulfate, and propylene sulfate.

6. The lithium ion battery according to claim 5, wherein an active material for the positive electrode is a transition metal oxide; and an active material for the negative electrode is graphite, a Si-containing composite material, or lithium titanate.

7. The lithium ion battery according to claim 6, wherein the transition metal oxide is $LiNi_xCo_yMn_zL_{(1-x-y-z)}O_2$, wherein L is one of Al, Sr, Mg, Ti, Ca, Zr, Zn, Si, and Fe; and values of x, y, and z satisfy: $0 \leq x < 1$, $0 < y < 1$, $0 \leq z < 1$, and $0 < x+y+z \leq 1$.

8. The lithium ion battery electrolyte according to claim 2, wherein the non-aqueous organic solvent comprises at least one of ethylene carbonate, propylene carbonate, butylene carbonate, dimethyl carbonate, diethyl carbonate, ethyl methyl carbonate, methyl n-propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

9. The lithium ion battery electrolyte according to claim 2, wherein
the non-aqueous organic solvent comprises at least one of ethylene carbonate, propylene carbonate, butylene carbonate, dimethyl carbonate, diethyl carbonate, ethyl methyl carbonate, methyl n-propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

10. The lithium ion battery according to claim 5, wherein a sum of a weight percent of the additive is smaller than or equal to 15 wt. %, based on the total weight of the electrolyte being 100 wt. %.

11. The lithium ion battery according to claim 5, wherein the non-aqueous organic solvent comprises at least one of ethylene carbonate, propylene carbonate, butylene carbonate, dimethyl carbonate, diethyl carbonate, ethyl methyl carbonate, methyl n-propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

12. The lithium ion battery according to claim 11, wherein a sum of the weight percent of the non-aqueous organic solvent is between 55% and 75%, based on the total weight of the electrolyte being 100 wt. %.

* * * * *